US00RE35962E

United States Patent [19]

Ball et al.

[11] E Patent Number: Re. 35,962

[45] Reissued Date of Patent: Nov. 17, 1998

[54] SINGLE LONGITUDINAL MODE PUMPED OPTICAL WAVEGUIDE LASER ARRANGEMENT

[75] Inventors: Gary A. Ball, Simsbury; William H. Glenn, Vernon, both of Conn.

[73] Assignee: United Technologies Corporation, Hartford, Conn.

[21] Appl. No.: 693,689

[22] Filed: Aug. 5, 1996

Related U.S. Patent Documents

Reissue of:

[64] Patent No.: 5,305,335
Issued: Apr. 19, 1994
Appl. No.: 17,069
Filed: Feb. 12, 1993

U.S. Applications:

[63] Continuation-in-part of Ser. No. 13,117, Feb. 1, 1993, Pat. No. 5,317,576, which is a continuation-in-part of Ser. No. 732,552, Jul. 19, 1991, abandoned, which is a continuation-in-part of Ser. No. 457,118, Dec. 26, 1989, abandoned.

[51] Int. Cl.[6] ..... H01S 3/30

[52] U.S. Cl. ..... 372/6; 372/102; 372/92

[58] Field of Search ..... 372/6, 102, 99, 372/92; 385/37

[56] References Cited

U.S. PATENT DOCUMENTS 5,191,585 3/1993 Huber ..... 372/6

FOREIGN PATENT DOCUMENTS 0435217 7/1991 European Pat. Off. ..... 372/6

*Primary Examiner*—Leon Scott, Jr.
*Attorney, Agent, or Firm*—Gerald L. DePardo

[57] ABSTRACT

An optical waveguide laser arrangement includes a solid optical waveguide having a waveguiding portion that extends along an axis between two spaced regions of the optical waveguide and is of a material capable of emitting stimulated light upon excitation by pumping light that is launched into the optical waveguide for axial propagation through the axially spaced regions of the optical waveguide. Two reflectors are provided, each being disposed at one of the axially spaced regions of the optical waveguide to delimit a laser resonator. At least one of the reflectors is constituted by a Bragg grating consisting of a multitude of axially consecutive periodic perturbations in the refractive index of the respective one of the axially spaced regions that cumulatively reflect the stimulated light at a reflectivity that decreases for adjacent longitudinal modes of the stimulated light with increasing deviation from a central wavelength. The axial length of the laser resonator, the reflectivity of the Bragg grating and the gain of the excitable material are so coordinated with one another as to sustain lasing in only a single longitudinal mode.

2 Claims, 4 Drawing Sheets

SINGLE LONGITUDINAL MODE PUMPED OPTICAL WAVEGUIDE LASER ARRANGEMENT

Matter enclosed in heavy brackets [ ] appears in the original patent but forms no part of this reissue specification; matter printed in italics indicates the additions made by reissue.

CROSS-REFERENCE TO RELATED APPLICATIONS

The present application is a continuation-in-part of copending U.S. patent application *Ser. No. 08/013,117, filed Feb. 1, 1993, now U.S. Pat. No. 5,317,576 which is a continuation-in-part of* Ser. No. 07/732,552, filed Jul. 19, 1991 *which* was a continuation-in-part of U.S. patent application Ser. No. 07/457,118, filed Dec. 26, 1989, [and Ser. No. 07/659,952, filed Feb. 26, 1991, both now] abandoned.

TECHNICAL FIELD

The present invention relates to pumped optical waveguide lasers in general, and more particularly to lasers of the above type which utilize reflective elements constituted by Bragg gratings to achieve lasing in a single longitudinal mode.

BACKGROUND ART

There are already known various constructions of pumped optical waveguide lasers, among them such utilizing fully or partially reflective coatings on the respective end faces delimiting the laser resonance cavities in solid material optical waveguides, and such using external reflectors to delimit the laser cavities. Even though these solutions have achieved quite a degree of success and/or acceptance in the laser manufacturing and utilization fields, they still suffer of certain drawbacks, one of which is that, because reflecting elements of the above type are reflective over a relatively wide frequency bandwidth, lasing often occurs in more than one mode. This is true even if the optical waveguide, such as an optical fiber, is of the so-called single mode type in which all transverse modes but one are below the cutoff. As a matter of fact, experience has shown that even such a single-mode optical fiber laser typically lases in a great number of longitudinal modes. This, of course, significantly degrades the properties of the laser radiation issued by the optical fiber laser due to mode beating and other optical effects, thus considerably reducing the utility of the issued laser beam. This multiple longitudinal mode operation diminishes if not defeats utility of such lasers for many applications in the telecommunications, sensor and spectroscopic evaluation fields.

Narrow-linewidth single-frequency semiconductor laser diodes are currently the source of choice in low to moderate power coherent systems. In laser diodes, single-frequency narrow-linewidth operation is typically achieved through a distributed feedback or a distributed Bragg reflector structure. Moreover, miniature, diode-pumped, single-frequency, narrow-linewidth solid state lasers are currently being manufactured in a variety of configurations. Both of these laser types, however, suffer of certain drawbacks, an important one of which is that, when they are to be used in optical fiber systems, they require integration into such systems that is alignment insensitive, and hence expensive. Therefore, for these applications, it would be preferable to use optical fiber lasers. However, experience has shown that it is not at all easy to achieve the desired single longitudinal mode operation in linear optical fiber lasers, especially when they are to have substantial lengths. This is so because, even when the reflectors axially delimiting the laser cavity are of the relatively narrow passband type, still the number of longitudinal modes falling within this passband and thus in competition for lasing is substantial when the length of the laser cavity is in excess of a few millimeters or centimeters. Because of this, it was heretofore very difficult if not impossible to provide a linear solid material optical waveguide, especially an optical fiber, laser that would lase exclusively in a single longitudinal mode.

Accordingly, it is a general object of the present invention to avoid the disadvantages of the prior art.

More particularly, it is an object of the present invention to provide pumped optical fiber laser arrangements which do not possess the disadvantages of the known arrangements of this kind.

Still another object of the present invention is so to develop the arrangements of the type here under consideration as to achieve lasing in only a single longitudinal mode.

It is yet another object of the present invention to devise arrangements of the above type which are able to achieve such single mode operation at various cavity lengths and gains of the optically excitable material of the optical waveguide.

A concomitant object of the present invention is to design the optical waveguide lasers of the above type in such a manner as to be relatively simple in construction, inexpensive to manufacture, easy to use and integrate into optical fiber systems, and yet reliable in operation.

DISCLOSURE OF THE INVENTION

In keeping with these objects and others which will become apparent hereafter, one feature of the present invention resides in an optical waveguide laser arrangement that includes a solid optical waveguide having a waveguiding portion that extends along an axis between two spaced regions of the optical waveguide and is of a material capable of emitting stimulated light upon excitation by pumping light, means for launching the pumping light into the optical waveguide for axial propagation through the axially spaced regions of the optical waveguide, and two reflectors each disposed at one of the axially spaced regions of the optical waveguide to delimit a laser resonator. According to the invention, at least one of the reflectors is constituted by a Bragg grating consisting of a multitude of axially consecutive periodic perturbations in the refractive index of the respective one of the axially spaced regions that cumulatively reflect the stimulated light at a reflectivity that decreases for adjacent longitudinal modes of the stimulated light with increasing deviation from a central wavelength, and the axial length of the laser resonator, the reflectivity of the one Bragg grating and the gain of the excitable material are so coordinated with one another as to sustain lasing in only a single one of the longitudinal modes of the stimulated light.

BRIEF DESCRIPTION OF THE DRAWING

The present invention will be described in more detail below with reference to the accompanying drawing in which.

BEST MODE FOR CARRYING OUT THE INVENTION

Figure 1:
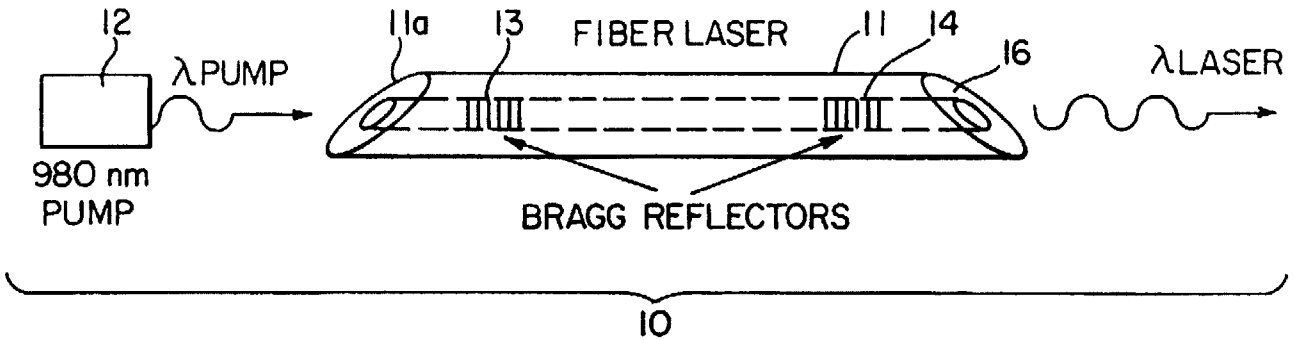
FIG. 1 is a somewhat simplified side elevational view of a laser arrangement of the present invention incorporating an optically pumped optical fiber axially delimited by slanted end faces.

Referring now to the drawings in detail, and first to FIG. 1 thereof, it may be seen that the reference numeral 10 has been used therein to identify a pumped optical fiber laser arrangement in its entirety. The arrangement 10 includes, as its main components, an optical fiber section 11 and a laser pump 12 which is of any known construction and advantageously is constituted by or includes a diode laser. The laser pump 12 issues light of a wavelength $\lambda_1$ that is launched, in any well known manner, into the optical fiber section 11 for propagation longitudinally thereof. As is well known to those practicing in this field, the optical fiber section 11 may include a fiber core and a cladding surrounding the core, with the stimulating light from the laser pump 12 being launched into and guided in the core. As shown, the optical fiber section 11 is delimited, as respective ends thereof, by respective end faces 11a and 11b that are inclined at the Bragg angle with respect to the axis of the section 11 to minimize or eliminate undesired reflections therefrom. It is assumed that optical feedback from other sources is negligible.

Figure 2:
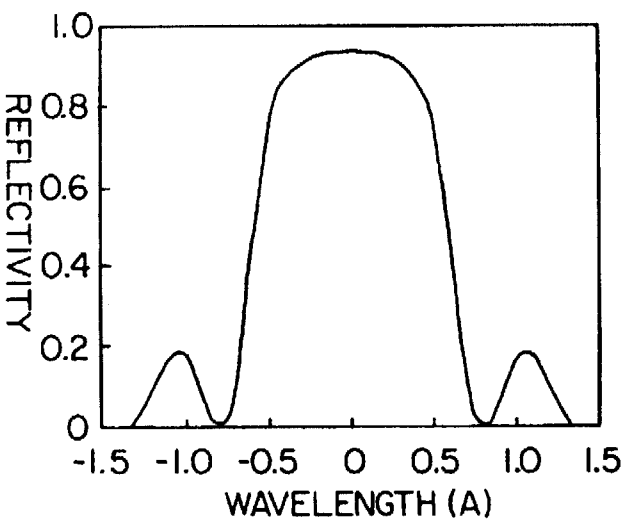
FIG. 2 is a graphic representation of the dependence of the reflectivity of the respective Bragg grating employed in the arrangement of FIG. 1 on frequency.

The optical fiber section 11 is shown to be provided, in the core thereof, with two gratings 13 and 14 which are spaced from one another in the axial or longitudinal direction of the section 11 and are shown to be situated close to the respective ends of the section 11. As shown in FIG. 2 of the drawing, the gratings 13 and 14 are reflective, to a greater or lesser degree, but only to light within a very narrow band around a central wavelength $\lambda_2$, being substantially transparent to light at all other wavelengths, preferably including, at least as far as the grating 13 is concerned, the pumping wavelength $\lambda_1$. The gratings 13 and 14 act as reflectors longitudinally delimiting the laser cavity in which the lasing takes place.

It is proposed in accordance with the present invention for the gratings 13 and 14 to be of the type, and to be made in accordance with the method, disclosed in the commonly owned U.S. Pat. No. 4,807,805, the disclosure of which is incorporated herein by reference to the extent necessary to provide additional explanation of the type of the Bragg gratings that is particularly suited for use in the optical fiber laser arrangement 10. As more fully explained in the above patent, gratings of this type act as wavelength selective reflectors. An embedded grating of specified periodicity will partially or fully reflect a specific wavelength of an optical signal carried by the fiber section 11. This type of grating, which has been developed for sensing stress and/or temperature changes in structures, is incorporated or embedded in the core of an optical fiber by a method disclosed in the above patent. As discussed there, permanent periodic gratings of this kind can be provided or impressed in the core of an optical fiber by exposing the core through the cladding to the interference pattern of two compatible ultraviolet light beams that are directed against the optical fiber at two angles relative to the fiber axis that supplement each other to 180°. This results in a situation where the material of the fiber core has permanent periodic variations in its refractive index impressed therein by the action of the interfering ultraviolet light beams thereon, with the individual grating elements (i.e. the periodically repetitive regions of the core exhibiting the same refractive index behavior) being oriented normal to the fiber axis so as to constitute a Bragg grating. The embedded Bragg grating of this kind reflects, of the light launched into or otherwise guidedly propagating in the fiber core in a propagation direction that brings it to the respective grating 13 or 14, only that having a wavelength within a very narrow range around a central wavelength $\lambda_2$ that is dependent on the grating element periodicity, back along the fiber axis opposite to the original propagation direction while being substantially transparent to light at wavelengths outside the aforementioned narrow band so that it does not adversely affect the passage of such other light therethrough. In effect, this type of grating creates a narrow notch in the transmission spectrum and, by the same token, a similarly narrow peak in the reflection spectrum. This reflection spectrum peak is being utilized in accordance with the present invention to determine the lasing wavelength $\lambda_2$, and the axial length of each of the gratings 13 and 14 is selected in such a manner as to obtain the desired reflectivities at the gratings 13 and 14, respectively.

For the optical fiber section 11 to operate as an optically pumped laser, the material of at least the core thereof is to contain at least one dopant, for instance a rare-earth element, such as neodymium or erbium. On the other hand, the above patent teaches the making of the gratings of the type here under consideration in germanium doped optical fiber cores. To obtain an optically pumped laser in accordance with the present invention, it is currently preferred to impress the gratings 13 and 14 directly into the (rare-earth doped) active material of the optical fiber section 11 (or its core), in which case at least the regions of the active material that are to be provided with the gratings 13 and 14 are doped with germanium as well. However, it would also be possible to form such gratings 13 and 14 in optical fiber pieces (or cores thereof) of a germanium-doped passive material, and to splice the same with an optical fiber piece made of, or having a core of, the rare-earth doped active material, to thus obtain the optical fiber section 11. In either event, the optical fiber section 11 is unitary or integral, so that no problems arising from the presence of interfaces or gaps are encountered.

It will be appreciated that the most useful output of the laser arrangement 10 is that in which the issued laser beam exhibits only a single longitudinal mode. Therefore, it is beneficial to determine the design constraints required to achieve single longitudinal mode operation from a standing wave, homogeneously broadened, three-level fiber laser of the above type which utilizes intracore Bragg reflectors for cavity feedback. In the following, there will be presented a closed-form solution to the laser rate equations which bounds the region in which only single longitudinal mode operation is supported under different conditions.

Especially when a communications grade fiber is used for the section 11, the output coupling through the gratings 13 and 14 results in the only significant cavity losses as both reflector and fiber propagation losses are considered to be negligible. As alluded to before, each Bragg reflector 13 and 14 is characterized by a reflectivity range which has a peak reflectivity and an associated bandwidth. In a typical grating having a length of approximately 1 to 2 cm, the reflectivity bandwidth is approximately 0.1 to 0.2 nm. Since lasing will only take place within this bandwidth, and the grating bandwidth is much less than the homogeneous gain linewidth in rare-earth, such as erbium, doped fibers, spatial hole burning is the primary source of multi-longitudinal mode operation in the linear fiber laser. Single longitudinal mode operation will therefore be maintained when the residual gain from spatial hole burning is insufficient for any mode other than the dominant mode to lase.

The gain in an erbium fiber may be found by solving the appropriate atomic rate equations. For instance, the three-level laser transition ($^4I_{13/2}$ and $^4I_{15/2}$) in an erbium doped germanosilicate fiber may be modeled according to the simplified four-level energy diagram shown in FIG. 4. A germanosilicate fiber composition was chosen since the germanosilicate core permits convenient noninvasive holographic formation of intracore Bragg reflectors. However this may not be the only material exhibiting such properties.

In the lasing process, pump photon ground state absorption excites electrons from level 1 to level 3. This absorption is followed by a rapid decay to level 2, which is the upper laser level. From level 2, the electron may decay to the ground level through either spontaneous emission or stimulated emission, at the signal wavelength. In this analysis, pump excited state absorption has been ignored since it does not pertain to the commonly used 980 nm and 1480 nm pump bands. Finally, as ion can be excited from the ground state to level 2 through the absorption of a signal photon.

Figure 4:
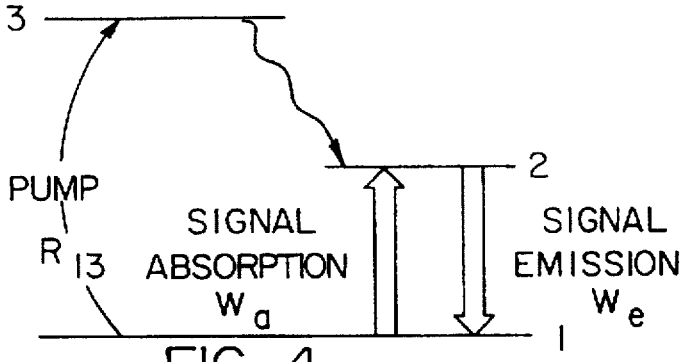
FIG. 4 is a simplified three-level energy diagram for erbium that may be used as an optically excitable material in the waveguiding portion of the optical fiber of FIG. 1.

Given the transition rates ($R_{13}$, $W_a$, and $W_e$) shown in FIG. 4, the spontaneous lifetimes ($\tau_{1\text{-}3}$), the simulated pump absorption cross-sections for ground state absorption ($\sigma_p$), the pump and signal photon intensities in the fiber ($I_p$ and $I_s$), and the pump and signal photon energies ($h\nu_p$ and $h\nu_s$), the rate equations governing steady state ion population density ($N_i$) in the four level system may be written. In the case where the spontaneous lifetime $\tau_3$ is much shorter than $\tau_2$, the ion population densities are given by $$N_1 = N_0\left[\frac{W_e + \frac{1}{\tau_2}}{W_a + W_e + \frac{1}{\tau_2} + R_{13}}\right] \tag{1}$$

and $$N_2 = N_0\left[\frac{W_a + R_{13}}{W_a + W_e + \frac{1}{\tau_2} + R_{13}}\right] \tag{2}$$

where the total population satisfies $N_o \approx N_1 + N_2$, since $N_3$ is negligible. In these rate equations, the transition rates are given by $R_{13} = \zeta_p I_p / h\nu_p$, $W_\alpha = \zeta_{s\alpha} I_s / h\nu_s$ and $W_e = \zeta_{se} I_s / h\nu_s$.

The gain is defined, in terms of the steady state ion population densities, as $$\alpha = (\sigma_e N_2 - \sigma_\alpha N_1) \tag{3}$$

which may be rewritten as $$a = \frac{a_0}{1 + \frac{\sum I_n}{I_{sat}}} \tag{4}$$

where $$a_0 = N_0 \frac{\sigma_e \tau_2 W_p - \sigma_a}{1 + \tau_2 W_p} \tag{5}$$

and $$I_{sat} = \frac{h\nu_s[W_p + 1/\tau_2]}{(\sigma_a - \sigma_e)} \ . \tag{6}$$

Given the gain and loss mechanisms within the resonator, the required design constraints to achieve single mode operation within a linear-cavity fiber laser which utilizes Bragg reflectors for cavity feedback can be found. In modeling the laser, the transient energy density per mode within the resonator will be considered. In general, this can be written as $$\frac{dE_n(x)}{dt} = aI_n(x) - \gamma I_n(x) \tag{7}$$

where $\alpha$ is the model gain, $\gamma$ is the modal loss, and n is the index of the lasing mode. For fiber lasers in which both fiber propagation and Bragg grating losses are negligible, $\gamma$ is given by $$\gamma = -\ln[R_1(\lambda)R_2(\lambda)], \tag{8}$$

where $R_1(\lambda)$ and $R_2(\lambda)$ the reflectivity spectra of the Bragg gratings. In determining the conditions for single mode operation, two potential longitudinal modes, $E_1$ and $E_2$, will be considered.

When considering the saturable gain presented in Eq. (4), only a solution in which pure standing waves are formed within the resonator will be considered. This assumption is justified when practical low-gain fiber lasers are considered. In general, erbium doped fibers with low doping concentrations yield relatively low small signal gains, 2–4 dB/m. For short resonator lengths, a relatively low loss cavity is therefore required to achieve lasing. This requirement leads to the use of relatively high reflectivity reflectors which produce a high contrast standing wave. Since in the low gain regime the pure standing wave will yield the maximum spatial hole burning, which is assumed to be the sole source of mode competition in the homogeneously broadened fiber laser, this assumption provides for a conservative design.

When considering the potential lasing of two modes within the resonator the gain, Eq. (4) may be rewritten and linearized as $$\alpha = \frac{a_0}{1 + \frac{I_1'(x) + I_2'(x)}{I_{sat}}} \approx a_0\left[1 - \frac{I_1'(x)}{I_{sat}} - \frac{I_2'(x)}{I_{sat}}\right] \tag{9}$$

where $$I_1'(x) = 2I_1 + 2I_1 \sin\left[\frac{2\pi Mx}{2L_c}\right], \tag{10a}$$

$$I_2'(x) = 2I_2 + 2I_2 \sin\left[\frac{2\pi Nx}{2L_c}\right], \tag{10b}$$

Lc is the cavity length and both M and N are integers. In expanding Eq. (9), the strong pump regime which results in a high saturation intensity, as presented in Eq. (6), will be considered. In the strong pump regime, the lasing power within the resonator is much less than the saturation intensity.

Introduction of the linearized gain, Eq. (9), into Eq. (7) and integration over the length of fiber result in the rate equation for the energy buildup for each mode:

$$\frac{d}{dt} E_{1,2} = (a_0 - \gamma_{1,2})I_{1,2} - 3\frac{a_0}{I_{sat}} I_{1,2}^2 - 2\frac{a_0}{I_{sat}} I_1 I_2. \quad (11)$$

At steady state, the intensity of each mode is then found to be $$I_{1,2} = \frac{I_{sat}}{3}\left(1 - \frac{\gamma_{1,2}}{a_0}\right) - \frac{2}{3} I_{2,1}. \quad (12)$$

Finally, when the laser is operating in a single mode, the slope efficiency, as given by Eq. (12), with respect to lasing power versus pump power, is determined to be $$\eta_s = \frac{1}{3} \frac{\lambda_p}{\lambda_1} \frac{\sigma_p}{\sigma_o + \sigma_e} \left[1 - \frac{\gamma_1}{a_0}\right] \frac{A_{laser}}{A_{pump}} \quad (13)$$

wherein $A_{laser}$ and $A_{pump}$ are the laser and pump mode areas, respectively. For comparison purposes, the mode areas will be presented as a function of the mode field diameter which is defined as $2.6\lambda/(\pi NA)$.

Stable single-mode operation will occur when the laser is operated above threshold so that mode 1 is operating at steady state with intensity $I_1$ and the losses incurred by mode 2 are greater than the gain so that the rate of energy buildup in mode 2 is negative. In this case, $$dE_2/dt<0$$

and when the steady state value of $I_1$, Eq. (12), is substituted into the energy density rate equation for mode 2, Eq. (11), we find $$\gamma 2 > \tfrac{1}{3}\alpha_0 + \tfrac{2}{3}\gamma 1 \quad (14)$$

which is the condition for single mode operation.

The condition for stable single mode operation is dependent on both the gain and the loss for the two lowest loss cavity modes. Since the gain medium is considered to be homogeneous and constant over the narrow grating reflector bandwidth, the gain is assumed to be identical for both modes. Mode discrimination must, therefore, result from the cavity loss mechanism. When narrow-band intracore Bragg reflectors are used for cavity feedback, a differential loss as a function of wavelength is naturally imposed on the cavity. Therefore, two neighboring longitudinal modes will encounter different cavity losses.

The reflectivity and transmission of rectangular Bragg gatings which are holographically written in a single mode fiber can be determined by using coupled mode theory. When weak guiding, negligible absorption, and negligible coupling of propagating modes to radiation modes are assumed, the grating reflectivity as a function of wavelength and grating length is given by $$R(L_g,\lambda) = \begin{cases} \dfrac{\Omega^2\sinh^2(SL_g)}{\Delta\beta^2\sinh^2(SL_g) + S^2\cosh^2(SL_g)} & \text{for } \Omega^2 > \Delta\beta^2 \\ \dfrac{\Omega^2\sin^2(QL_g)}{\Delta\beta^2\sin^2(QL_g) - Q^2\cos^2(QL_g)} & \text{for } \Omega^2 < \Delta\beta^2 \end{cases} \quad (15)$$

where $\lambda$ is the wavelength, $L_g$ is the grating length, $\Omega$ is the coupling coefficient, $\Delta\beta=\beta-(\pi/\Lambda)$, $\beta$ is the eigen propagation constant, $\Lambda$ is the grating period, $S=(\Omega^2-\Delta\beta^2)^{1/2}$, and $Q=(\Delta\beta^2-\Omega^2)^{1/2}$. The coupling co-efficient $\Omega$ is dependent on the induced index perturbation which is a function of the fiber composition and grating exposure. For the purposes of this simplified basic fiber laser analysis, this treatment of the grating reflectors will be employed and the gain from the doped fiber grating region will be neglected.

Gratings with reflectivities ranging between 0–100%, and bandwidths ranging between 0.1–0.2 nm regime have been fabricated in erbium doped germanosilicate fibers. In the case of germanosilicate fibers, n is generally on the order of $5\times10^{-4}$. For a 1 cm, 95% reflection grating, the theoretical reflectivity as a function of wavelength is shown in FIG. 2. It is noted that the predicted bandwidth of the reflector is approximately 0.12 nm, which is in good agreement with experimentally obtained results.

When evaluating the condition for single mode operation, Eq. (14), the case where the dominant lasing mode is at line center and the gain within the grating region is negligible will be considered initially. The next mode will then be detuned one free spectral range from the line center. This corresponds to a $\Delta\beta$ of $$\Delta\beta_{FSR} = \frac{\pi}{nL_c} \quad (16)$$

where $L_c$ is the fiber laser cavity length.

In addition to the mode discrimination from a pair of Bragg reflectors 13 and 14 that are used to define a linear cavity in the laser arrangement 10 illustrated in FIG. 1, the case in which a Bragg reflector and a complex reflector formed by two closely spaced Braggs gratings or one Bragg grating and a planar reflector, such as a multilayer dielectric coating or the 4% reflection from the end of a normally cleaved fiber, should be discussed since this will result in enhanced mode selectivity. To evaluate the reflectivity from such a structure, the discussion will be limited to the case where the fiber between the reflectors of the reflector pair has negligible gain and the reflector pair forms a complex coupler instead of a coupled resonator.

Figure 3:
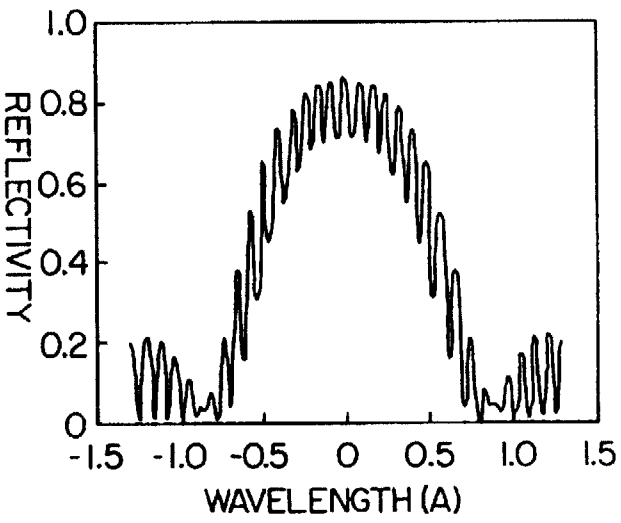
FIG. 3 is a view corresponding to that of FIG. 2 but showing a reflectivity curve obtained when at least one of the end faces of the optical waveguide of FIG. 1 extends normal to the optical fiber axis.

Analysis of the reflectance from multiple gratings, and/or a single grating with a broadband reflector is treated according to the cascaded T matrix approach. The reflectivity spectrum from a complex reflector consisting of a Bragg grating with an 80% reflectivity and a 1 cm length and a normally cleaved fiber end face (instead of the slanted end face 11a or 11b of FIG. 1) yielding a 4% reflection located 10 cm from the Braggs grating is shown in FIG. 3. In this case, a considerably narrower effective bandwidth than before is realized, which results in further improved mode discrimination. This allows for the use of both higher gain fibers and/or increased fiber lengths. This is desirable when increased laser powers are required.

Under the model described above, the bounds of single-frequency operation can be determined as a function of grating reflectivity and resonator length when the grating length, grating wavelength, fiber small signal gain, and effective fiber refractive index are known. While we are not limited to these variables, they are convenient when using commercially available fiber. The bounds of single mode operation will then range between a lower limit, which is defined by the lasing threshold, and an upper limit in which the laser will transition from single to multimode operation due to spatial hole burning as given by Eq. (14). In all calculations discussed here, we will assume a laser having a pair of identical gratings of peak reflectivity $R_{max}$.

Figure 5A:
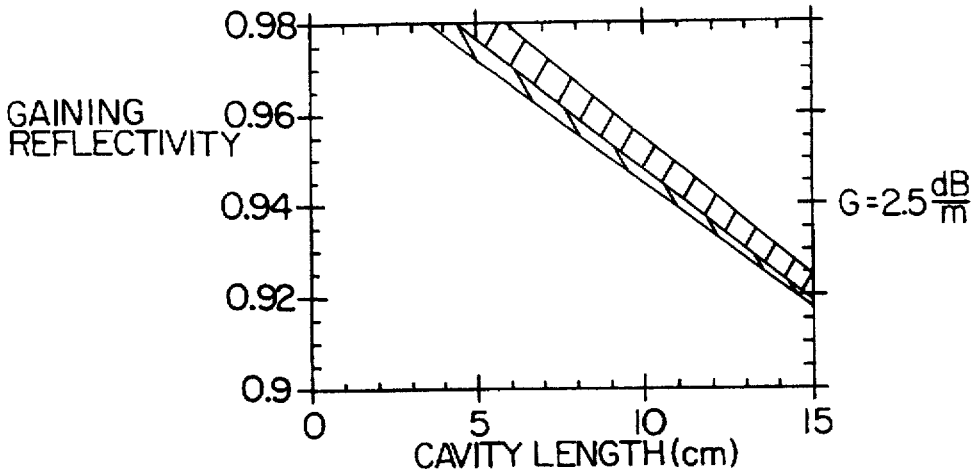
FIGS. 5a to 5c are graphic representations of single frequency operation domains in dependence on the laser cavity length and grating reflectivity at different gains and using gratings of different lengths.
Figure 5B:
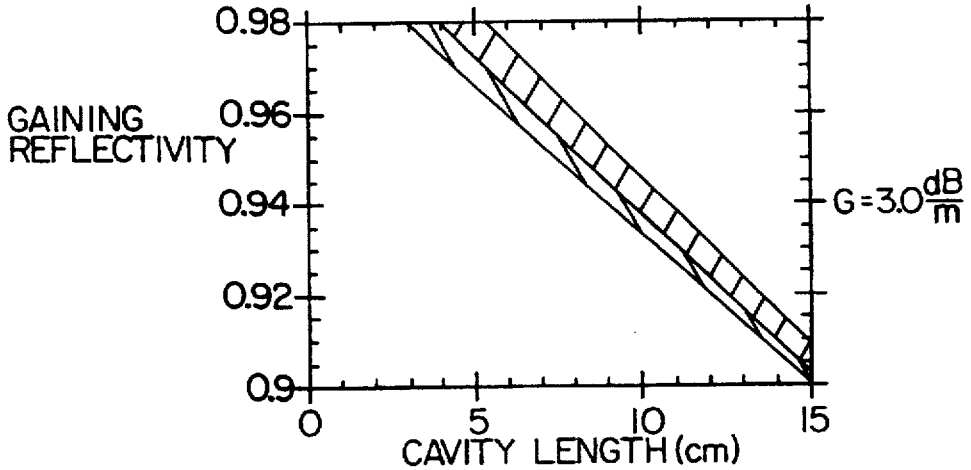
Figure 5C:
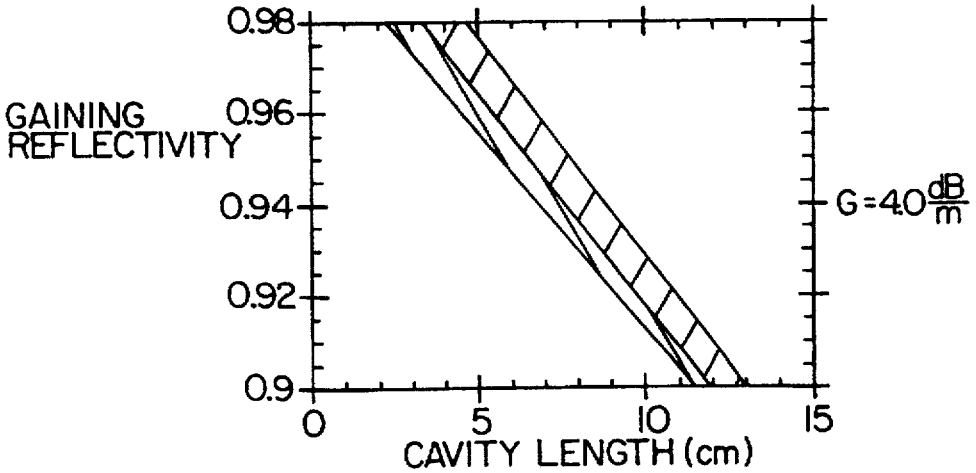

The single-frequency domain, defined between the lasing threshold and the solution to Eq. (14), is shown in FIG. 5 as a function of grating reflectivity and resonator length, for six fiber laser designs. All plots assume a laser wavelength of 1.53 μm, and a fiber having an effective refractive index of 1.46 of FIG. 5a defines the single frequency domain for a fiber having a small signal gain of 2.5 dB/m. In FIG. 5a, the darkly shaded lower region represents the use of 1.25 cm length gratings. FIGS. 5b and 5c are to be interpreted similarly, but the fiber small signal gains are 3.0 dB/m and 4.0 dB/m, respectively. Again, it is noted that the gratings having a gain of unity in this simplified analysis.

Figure 6A:
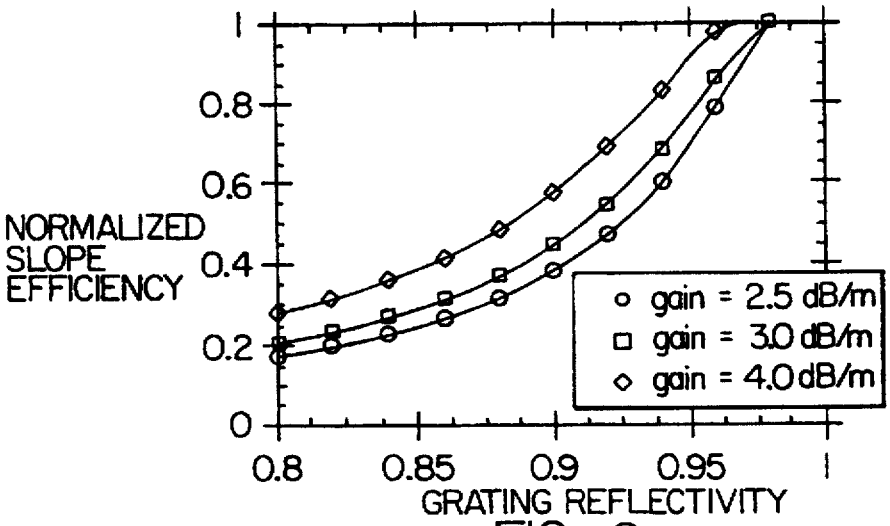
FIGS. 6a and 6b are graphic representations of normalized slope efficiencies as functions of grating reflectivities for fibers having different gains and for different grating lengths.
Figure 6B:
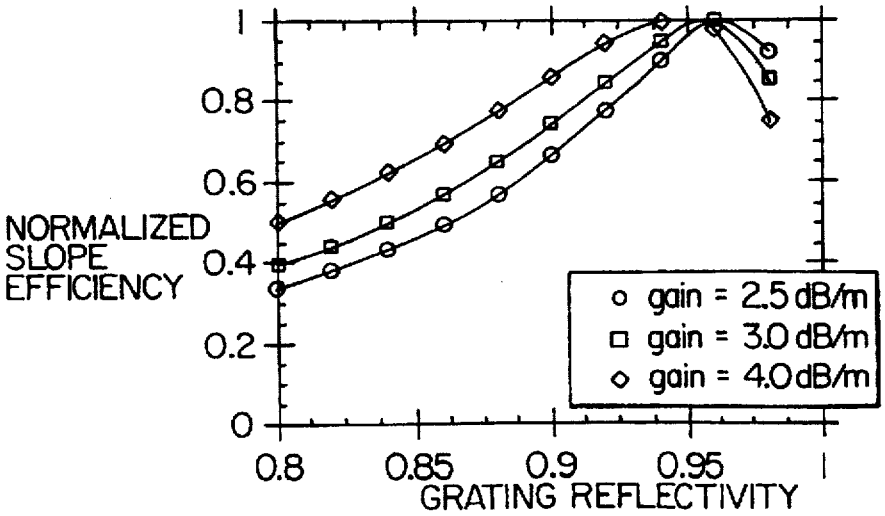

The laser slope efficiency is found to be maximum at the single/multimode boundary. The normalized slope efficiency, as given by Eq. (13) is shown in FIG. 6 as a function of grating reflectivity for fiber gains of 2.5 dB/m, 3.0 dB/m and 4.0 dB/m. FIG. 6a represents the use of 1.25 cm gratings and FIG. 6b represents the use of 2.5 cm gratings.

When considering single-frequency fiber laser which utilize intracore Bragg reflectors, a factor of importance is the stability of the single mode solution. That is, it is to be determined to what extent the single lasing mode can be detuned from the grating resonance peak before the cavity loss of the neighboring mode decreases relative to the increasing cavity loss of the dominant mode to the point that multimode operation exists, or Eq. (14) is violated. The stability of the solution is important since the fiber optical path length is strongly effected by thermal, acoustic, and strain variation perturbations, making the cavity length difficult to fix, and a relatively small optical path length variation, $\lambda/2n$, will shift the resonance by one free-spectral-range.

Up to this point, it has been assumed that the dominant lasing mode resides at the Bragg grating line center. Under small resonator optical path length perturbations, the longitudinal modes of the resonator will shift under the Bragg grating spectrum and the free spectral range will not significantly vary. The shift can therefore be normalized with respect to the laser free spectral range. If the fraction of a free spectral range by which the dominant mode is shifted from the grating line center is given by q, where q=0 indicates that the dominant lasing mode is on the center of grating resonance, the maximum resonance shift, $q_{max}$, at which point the laser will transition from single mode to multimode operation can be determined. The maximum resonance shift $q_{max}$ may then be plotted as a function of grating pair reflectivity.

Figure 7A:
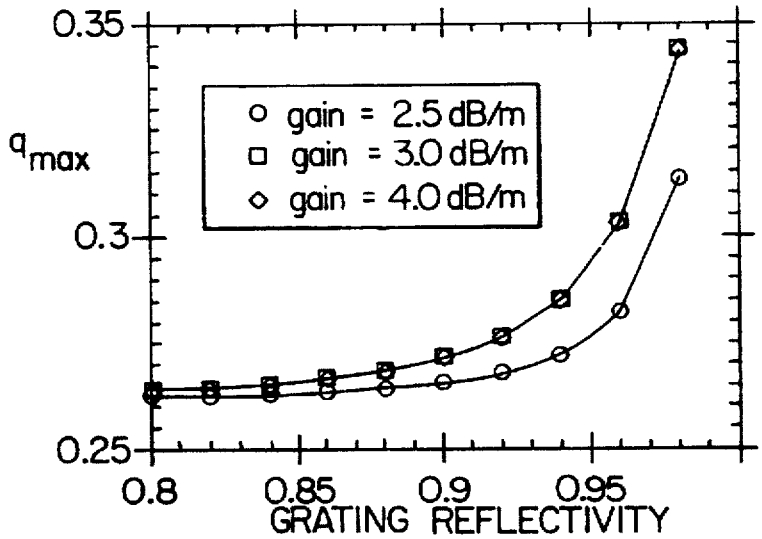
FIGS. 7a and 7b are graphic representations of the dependence of the maximum permissible dominant longitudinal mode shaft from the grating central wavelength before transitioning from single mode to multimode operation on grating reflectivity for different grating lengths.
Figure 7B:
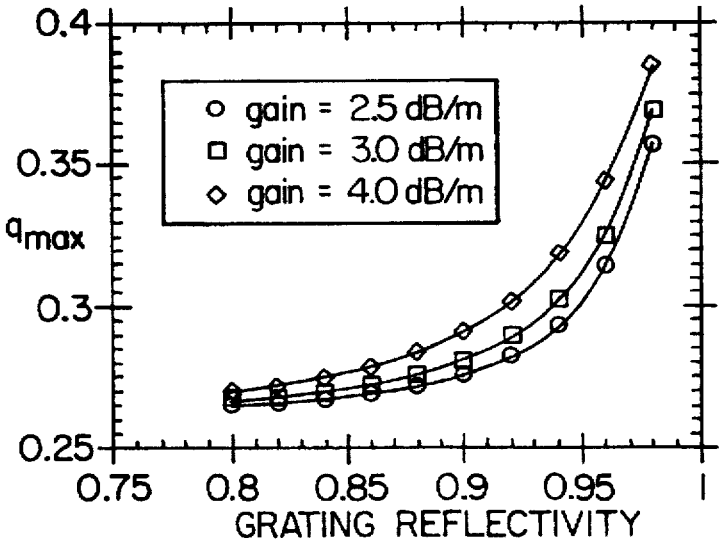

The single frequency stability for a laser length which lies half way between laser threshold and the single-mode/multimode boundary is shown in FIG. 7. Once again, FIG. 7 is plotted as a function of grating reflectivity of gains of 2.5 dB/m, 3.0 dB/m, and 4.0 dB/m. FIG. 7a represents the use of 1.25 cm gratings and FIG. 7b represents the use of 2.5 cm gratings. It is noted that q is zero when the reflectivity and length are chosen to lie on either the single frequency operation boundary or the threshold boundary. Although the slope efficiency of the fiber laser, when operating half way between the single mode/multimode boundaries, is approximately 50% of that when the laser is designed to operate on the single-mode/multimode boundary, the solution is significantly more stable.

In order to partially assess the validity of the design criteria required to achieve single mode operation, a fiber laser was designed, constructed, and tested. The 1.53 μm fiber laser was designed in erbium doped germanosilicate fiber. The fiber was doped at approximately 500 ppm, has a 1.02 μm cutoff wavelength, and a NA of 0.24. The small signal gain was approximately 3 dB/m, in the strong pump regime, when the fiber was pumped at 980 nm with a Ti-Sapphire laser. The computed single-frequency design bounds for these conditions are shown in FIG. 5a.

The fiber laser design consisted of a pair of 95% Bragg reflectors separated by a 9 cm cavity. This design was chosen to achieve a relatively high slope efficiency and reasonable stability with respect to frequency drift.

The Bragg reflectors were written holographically through the fiber cladding. The optics used to fabricate the gratings limited the grating length to approximately 1.25 cm, which permitted gratings with linewidths of approximately 0.1 nm to be fabricated. Since the grating wavelength typically shifts slightly as a function of increased exposure, due to a slight increase in the average refractive index, both Bragg reflectors where chosen to have the same reflectivity in an effort to maximize mode discrimination through optimum grating overlap.

Single mode operation was confirmed with a scanning Fabry-Perot interferometer. The fiber laser threshold was extremely low since it took little pump power to nearly completely invert the fiber laser. Experimental limitations in separating the pump and laser power at the laser output did not permit an accurate measurement of the fiber laser threshold; however, the slope efficiency of the laser with respect to launched pump power was measured to be approximately 0.13%. This value is in good agreement with the 0.151% which is computed from Eq. (13) and may be increased more than two orders of magnitude when used in an integrated master oscillator power amplifier configuration which utilizes all pump radiation.

Thus, it may be seen that a technique has been developed for determining the design parameters relative to achieving single-frequency operation in a fiber laser which utilizes intracore Bragg reflectors for mode discrimination. Given the rare-earth doped fiber and Bragg reflector characteristics, the single-frequency operation regime, relative slope efficiency, and relative fiber laser stability can be determined.

While the present invention has been illustrated and described as embodied in a particular construction of an embedded grating laser arrangement, it will be appreciated that such invention is not limited to this particular example; rather, the scope of protection thereof is to be determined solely from the attached claims.

We claim:

1. In an optical waveguide laser arrangement including a solid optical waveguide having a gain portion that extends along an axis between two axially spaced reflectors disposed along the optical waveguide, said gain portion being of an excitable material which emits stimulated light upon excitation by pumping light, means for launching the pumping light into the optical waveguide for axial propagation along the optical waveguide, the two reflectors axially delimiting said gain portion thereby forming a laser resonator in said gain portion, the improvement wherein at least one of the reflectors is constituted by a Bragg grating consisting of a plurality of axially consecutive periodic perturbations in the refractive index of the optical waveguide, said Bragg grating reflecting the stimulated light with a reflectivity profile this is a maximum at a central wavelength corresponding to a central longitudinal mode of the laser resonator, said reflectivity profile decreasing for longitudinal modes adjacent to said central longitudinal mode of the laser resonator, and wherein the axial length of the laser resonator, the reflectivity of the one Bragg grating, and the gain of the excitable material are such that lasting occurs only at said central longitudinal mode of the laser resonator.

2. The improvement as defined in claim 1, wherein both of said two reflectors are constituted by said Bragg gratings.

* * * * *